3,657,333
PROCESS FOR THE PRODUCTION OF PURE FUMARIC ACID FROM AQUEOUS SOLUTIONS THEREOF

Paul Ackermann, Moers, and Helmut Heinrichs, Homberg (Lower Rhine), Germany, assignors to Polycarbona Chemie GmbH, Homberg (Lower Rhine), Germany
No Drawing. Filed June 6, 1969, Ser. No. 831,196
Claims priority, application Germany, June 8, 1968, P 17 68 629.2
Int. Cl. C07c *51/42, 57/14*
U.S. Cl. 260—527 R         9 Claims

ABSTRACT OF THE DISCLOSURE

Pure fumaric acid is recovered from aqueous solutions containing it, especially from wash waters obtained in the cleaning of equipment for refining maleic acid or maleic acid anhydride, by filtering a hot aqueous solution of the raw fumaric acid, separating and drying the fumaric acid from the filtrate and subjecting it to a thermal treatment at 170 to 240° C. in an oxygen poor atmosphere, dissolving the resulting product in hot water, filtering the hot solution and treating the filtrate with decolorizing agents.

---

The invention relates to the production of pure fumaric acid from aqueous solutions, in particular from the wash waters obtained in the cleaning of refining equipment for maleic acid or maleic acid anhydride.

Maleic acid anhydride or maleic acid are known to be produced by catalytic oxidation of hydrocarbons, especially of benzene, with air in the gas phase using catalysts preferably containing vanadium pentoxide. The raw maleic acid is usually washed from the gaseous oxidation products and processed to pure maleic acid anhydride. In the maleic acid or maleic acid anhydride refining or distillation equipment, a residue is deposited which has to be removed at certain intervals. This is generally done by wash distillation. In addition to maleic acid, the wash waters contain major or minor amounts of fumaric acid. It is known in the art to isomerize the maleic acid dissolved in the wash water to fumaric acid in the presence of, for example, thio-urea or other isomerization catalysts.

However, the raw fumaric acid obtained from these wash waters is accompanied by an acidic, readily water-soluble, brown organic material, the so-called acid tar. As this tar firmly sticks to the fumaric acid crystallizing out, it is extremely difficult to obtain pure fumaric acid from the wash waters of maleic acid anhydride equipment.

As is known in the art, maleic acid, or fumaric acid obtained by isomerization of maleic acid, can be purified to a high degree by recrystallization from water in the presence of activated charcoal and/or cation exchangers. According to the process disclosed in German published patent application (DAS) 1,260,463 for the purification of raw maleic acid solutions intended for subsequent conversion to fumaric acid, the raw solution is successively treated with activated charcoal, cation exchanger and again with activated charcoal. However, as shown by the examples of that application, the Hazen color thus obtained is maximally 35, indicating a purity which is inadequate for some uses. The recovery of pure fumaric acid from the wash waters of maleic acid anhydride refining equipment using conventional processes has proved to be unfeasible owing to the substantial amounts of acid tar present.

In the process of this invention, highly pure fumaric acid is recovered from the residues formed in equipment for refining maleic acid or maleic acid anhydride, especially from the wash waters used in cleaning such equipment.

Essentially, the process of this invention comprises filtering a hot aqueous solution of the raw fumaric acid (e.g. wash water from the aforementioned equipment), cooling the filtrate, optionally after isomerization of its maleic acid content to fumaric acid, separating from the filtrate the prepurified fumaric acid which crystallizes out upon cooling, drying the fumaric acid crystalline agglomerate, and subjecting it to a thermal (i.e. heat) treatment in an atmosphere having a low oxygen content, preferably an oxygen-free atmosphere, then dissolving the thermally treated material in hot water, filtering the hot solution, treating the hot solution with conventional decolorizing agents and separating out the decolorizing agents. The resulting aqueous solution of fumaric acid may be used in further processing or the pure fumaric acid may be crystallized out and the solid dried.

The thermal treatment of the prepurified fumaric acid crystals is a salient feature of this invention. Such thermal treatment may be carried out at 170° C. to 240° C. but best results in terms of purity of the fumaric acid produced have been obtained when operating at 190° C. to 210° C. Treatment can be carried out from 1 to 20 hours, although more usually treatment for from 1 to 5 hours will be sufficient and thus is preferred.

It is already known, as may be seen, for example, from German Pat. 1,184,339 that raw maleic acid anhydride can be purified by maintaining it at an elevated temperature for an extended period of time and thus converting the impurities contained in it to materials from which a purer maleic acid anhydride may be recovered by distillation. However, this known process, which relies on distillation only, is very time-consuming and cannot be used for the purification of fumaric acid owing to the lower thermal resistance of the latter.

The process according to the invention provides for at least two filtrations of the hot solution containing fumaric acid. In the first filtration, especially the granular carbonaceous solid from the maleic acid anhydride refining equipment, which might disturb the thermal treatment of the raw fumaric acid, is separated. In the second filtration, mainly the water-insoluble product obtained in the thermal treatment of the acid tar, which hitherto has considerably reduced the effectiveness of the decolorants, is separated.

If activated charcoal is used as the decolorant in the process according to the invention and is suspended in the hot fumaric acid solution, it must be separated from the hot solution before the fumaric acid crystallizes out. Therefore, in the process according to the invention, fumaric acid is crystallized out or recrystallized two times from aqueous solution. The raw fumaric acid must first be separated from the wash water and then pre-dried to some extent for the subsequent thermal treatment. The finally obtained pure fumaric acid can also be separated in crystal form from the filtrate decolorized, for example, with activated charcoal, unless it is preferred to use it in aqueous solution for preparing salts, for example. The separation of the fumaric acid can be carried out stepwise or continuously by conventional methods, such as filtration or centrifuging. The filtrate remaining after the separation of the raw fumaric acid may be re-used for scalding the maleic acid anhydride refining equipment.

However, in case of a high acid tar content, it should be discarded. The filtrate of the pure fumaric acid is in any case suitable for the scalding of the maleic acid anhydride refining equipment and, to a limited extent, also for dissolving the thermally treated raw fumaric acid.

The thermal treatment of the raw fumaric acid may also be carried out stepwise or continuously. As heat transfer in the static crystal mass of the raw fumaric acid is relatively poor, it is expedient to agitate the mass using suitable conventional equipment. For continuous operation, for example, a horizontal static cylinder externally heated with steam or a liquid heat transfer medium is convenient. The fumaric acid is continuously fed to the cylinder from a hopper and constantly turned over and gradually passed through the cylinder by means of rods or blades radially arranged on an axial driving shaft. The atmosphere in the cylinder should contain less than 10 percent by volume of oxygen. It may consist, for example, of a mixture of air contained in the crystalline aggregate being treated and of inert gas, for example, nitrogen or carbon dioxide passed in at a low rate of flow countercurrent to the fumaric acid stream. The gas from the cylinder may be passed in countercurrent to the fumaric acid feed stream and heated thereby. As the gas cools down in the cylinder, the fumaric acid entrained in vapor form is sublimated from it; the gas removes the last traces of moisture from the incoming fumaric acid feed. At temperatures lower than 90° C., the gas stream may be removed from the feed and passed from the cylinder separately, if desired. This will preclude any remoistening of cold feed material in the hopper.

All parts of equipment coming into contact with the fumaric acid should either have an acid-resistant coating or should be made of stainless steel.

In the following description of tests and examples, the terms cake A, B, or C were used to indicate whether the fumaric acid was isolated by crystallization and separation for the first, second, or third time, respectively.

The following test results show the relatively small effect of conventional refining measures compared to that of the process according to the invention as illustrated in the following examples. Unless stated otherwise, the color data relate to a 5 percent weight solution in methanol.

A sample of hot filtered washing liquid from the cleaning of an industrial maleic acid anhydride refining facility was cooled, the fumaric acid was crystallized out, separated from the liquid on a suction filter, then washed with a small amoununt of water. 65 grams of fumaric acid (cake A) were obtained from 1 liter washing liquid. 1 liter of the filtrate contained 6 grams of fumaric acid, 16 grams of maleic acid and 55 grams of acid tar. Cake A was brown, giving a Hazen color of 21,000.

One portion of cake A was recrystallized in water to form cake $B_0$ having a Hazen color of 20,000.

Another portion of cake A was recrystallized in water, using 2 percent weight of activated charcoal to form cake $B_1$ having a Hazen color of 12,000.

A portion of cake $B_0$ is recrystallized in water to form cake $C_0$ having a Hazen color of 12,000. A portion of cake $B_0$ was recrystallized in water, using 2 percent weight of activated charcoal to form cake $C_1$ having a Hazen color of 10,000.

EXAMPLE 1

Cake A, consisting of raw fumaric acid, having a Hazen color of 21,000, was maintained at 190 to 210° C., to the exclusion of air in a rotating drum for 1 hour, during which treatment the material darkened to a brownish black color. This thermally treated cake was designated as "$t$." A portion of $A_t$ was dissolved in water at 100° C. The solution was separated from the blackish residue by filtration. The hot filtrate was agitated with 5 percent weight of activated charcoal, based on the fumaric acid content, at 95° C. for 30 minutes, and was separated from the charcoal at about 98° C. by filtration. The filtrate was almost colorless. Upon cooling, white fumaric acid was crystallized out (cake $B_3$), which, in a 5 percent solution of methanol, had a Hazen color of 5. When esterified with 2-ethylhexanol, cake $B_3$ gave a diester having a Hazen color of 20 (undiluted). By comparison, commercial samples of pure fumaric acid yielded a diester with $C_8$-alcohol, having a Hazen color of 35 in one case, and of 105 in another. The filtrate from cake $B_3$ still contained about 10 percent of the fumaric acid contained in cake $A_t$ in a dissolved state. It was used for the cleaning of the maleic acid anhydride refining equipment.

The difference between the process of the invention when recrystallizing the thermally treated fumaric acid-cake $A_t$ and alternative methods becomes evident from the following comparison.

Cake $A_t$, dissolved in water and filtered when still hot, then treated with 2 percent weight of activated charcoal, and filtered when still hot, upon cooling yielded fumaric acid (cake $B_2$) having a Hazen color of 50.

Cake $A_t$, dissolved in water when hot and directly treated with 2 percent weight of activated charcoal, and filtered when still hot, upon cooling yielded fumaric acid (cake $B_1$) having a Hazen color of 750.

Cake $A_t$, dissolved in water and filtered when hot, without treatment of charcoal, upon cooling yielded fumaric acid having a Hazen color of 2100.

EXAMPLE 2

The hot wash water from the cleaning of maleic acid anhydride refining equipment was filtered. It contained about 65 kilos fumaric acid, 18 kilos maleic acid, and 52 kilos acid tar per cubic meter. 800 grams of thiourea dissolved in water were added at 70° C. while stirring, and the temperature was maintained at about 65 to 60° C. for 4 hours. The fumaric acid which crystallized out after cooling to 12° C. was separated from the liquid by filtration and rewashed with a small quantity of water. Upon drying, a raw fumaric acid (cake A) weighing 80 kilos and containing 75 kilos of fumaric acid was obtained. Cake A was passed, in a weak countercurrent of nitrogen, through a stainless steel pipe heated with steam to 203° C. by means of narrow vanes moved by an axial shaft and ensuring continuous mixing, so that a total residence time of 2 hours resulted.

The raw fumaric acid $A_t$ thus obtained was dissolved in a 15-fold amount of boiling water and filtered when still hot. After addition of 5 percent weight of activated charcoal, based on the fumaric acid content, the filtrate was agitated with activated charcoal at 97° C. for 1 hour, filtered when hot and cooled, the fumaric acid which crystallized out was filtered, and upon drying corresponded to 87 percent weight of the fumaric acid contained in cake A or 89 percent weight of the fumaric acid contained in cake $A_t$. The Hazen color was 10. Eleven percent of the fumaric acid of the cake $A_t$ remained dissolved in the filtrate and, together with the filtrate, were reused for washing the maleic acid anhydride refining equipment.

When the thermal treatment of cake A was carried out under the same conditions except that a weak air stream was passed through countercurrent instead of an inert gas stream, 6 rather than 2 percent weight of the fumaric acid contained in cake A were destroyed. Moreover, the fumaric acid recovered from cake $A_t$ by the process according to the invention, comprising filtration of the hot solution, treatment with 5 percent weight of activated charcoal, hot filtration and allowing to crystallize out, had a Hazen color of 45.

The relatively simple thermal treatment of raw fumaric acid provided by this invention thus surprisingly improves the effectiveness of the decolorants to a very substantial degree, so that high purity fumaric acid can be recovered even from heavily contaminated wash solutions from maleic acid anhydride plants.

What is claimed is:

1. A process for the production of pure fumaric acid from aqueous solutions thereof which process comprises filtering a hot aqueous solution of the raw fumaric acid, cooling the filtrate, separating from the filtrate the prepurified fumaric acid crystallized out, drying the crystalline prepurified fumaric acid thus obtained, subjecting it to a thermal treatment at 170° C. to 240° C., in an atmosphere essentially oxygen-free for 1 to 20 hours, dissolving the resulting product in hot water, filtering the resulting solution while hot, treating the product filtrate with decolorizing agents and removing the decolorizing agents from the solution.

2. A process as claimed in claim 1 in which maleic acid contained in the said hot aqueous solution of the raw fumaric acid is isomerized to fumaric acid prior to cooling the filtrate obtained from such hot aqueous solution.

3. A process as claimed in claim 1 wherein said thermal treatment is carried out from 190 to 210° C.

4. A process as claimed in claim 1 wherein said thermal treatment is carried out in an atmosphere free of oxygen.

5. A process as claimed in claim 1 wherein said thermal treatment is carried out for from 1 to 5 hours.

6. A process as claimed in claim 1 wherein the said product filtrate, after being treated with decolorizing agents which are then removed from the solution, is cooled to crystallize out pure fumaric acid.

7. A process as claimed in claim 6 wherein the pure fumaric acid which has been crystallized out is dried.

8. A process as claimed in claim 1 wherein the crystalline prepurified and dried fumaric acid is continuously agitated during said thermal treatment.

9. A process as claimed in claim 1 wherein the crystalline prepurified fumaric acid is continuously passed through a heated chamber countercurrent to an essentially oxygen-free gas stream, which gas stream dries the said crystalline prepurified fumaric acid.

References Cited

Chemical Abstracts, 70: 37105j.
Chemical Abstracts, 70: 37108n.

JAMES A. PATTEN, Primary Examiner

V. GARNER, Assistant Examiner

U.S. Cl. X.R.

260—533 N, 537 N